United States Patent [19]

Kato

[11] 4,435,722

[45] Mar. 6, 1984

[54] ELECTROPHOTOGRAPHIC RECORDING APPARATUS

[75] Inventor: Hideaki Kato, Hachioji, Japan

[73] Assignee: Konishiroku Photo Industry Co., Ltd., Tokyo, Japan

[21] Appl. No.: 254,464

[22] Filed: Apr. 14, 1981

[30] Foreign Application Priority Data

Apr. 15, 1980 [JP] Japan ........................ 55-51535[U]

[51] Int. Cl.³ ........................ G01D 15/06

[52] U.S. Cl. ........................ 346/153.1; 346/160; 200/61.62

[58] Field of Search ........................ 346/107–108, 346/125, 153.1, 160; 355/1, 3 R; 200/61.62, 61.7, 61.8, 50 A, 61.69; 307/326, 328

[56] References Cited

U.S. PATENT DOCUMENTS

| | | | |
|---|---|---|---|
| 3,619,592 | 11/1971 | Lamb, Jr. | 200/61.62 X |
| 3,655,926 | 4/1972 | Meermans | 200/61.62 X |
| 4,101,750 | 7/1978 | Doner | 200/50 A X |
| 4,268,159 | 5/1981 | Tashiro | 346/160 X |

*Primary Examiner*—Thomas H. Tarcza

*Attorney, Agent, or Firm*—Jordan B. Bierman; Linda Bierman

[57] ABSTRACT

An electrophotographic recording apparatus incorporating an electrostatic recording head disposed in closely spaced gap-defining proximity to the surface of a rotatable charge carrying drum additionally includes a light source for illuminating the gap when a housing door of the copier is open. The illuminated gap is thereby readily visible to facilitate verification of proper spacing between the drum surface and the recording head. A manually operable switch disposed within the housing permits normally-disabled rotation of the drum when the housing door is open so that the presence and width of the gap may be verified along the entire circumference of the rotatable drum.

5 Claims, 3 Drawing Figures

ELECTROPHOTOGRAPHIC RECORDING APPARATUS

BACKGROUND OF THE INVENTION

1. Field of the Invention

The present invention relates to an electrophotographic recording apparatus to form, on a charge carrying drum namely on a photoconductive or dielectric image carrier, electrostatic latent images from data as supplied in a form of electric signals from information processing apparatuses such as the electronic computer with use of an electrostatic recording head such as an optical fiber tube and to develop visible images from these electrostatic latent images by an electrophotographic process for recording in copy sheets wherein a gap between the recording head and the image carrier may be readily checked at high accuracy.

2. Description of the Prior Art

Electrophotographic data recording apparatuses have recently been developed and are being applied for use as the computer terminal, output device for data transmitted through communication lines, output printing unit of facsimile system, etc. Examples of the above electrostatic recording head that transforms electric signals into image patterns are the optical fiber tube, cathode ray tube, and needle electrode. By way of example, the optical fiber tube (hereinafter referred to as "OFT") is used in the following description.

The image quality including focusing condition, and size, uniformity and sharpness of copy characters is much affected by the gap between the tip of OFT and the photoconductive image carrier. For example, in case of a wide gap, copy characters are often blurred and much distorted. Therefore, it is very important to this type of equipment to accurately adjust the gap between the tip of OFT and the photoconductive image carrier. Since this gap is narrow and 100 to 500 $\mu m$ wide, its adjustment is rather difficult and requires much time. If the photoconductive image carrier is provided in a form of drum, the gap sometimes fluctuates, with the tip of OFT and the surface of photoconductive touching each other in extreme cases, depending on eccentricity of drum, allowance on its mount position, etc., so it is necessary to check the gap along the whole circumference of drum. Though the above gap 100 to 500 $\mu m$ wide can be checked, for example, by a method making use of a thickness gauge, it has been found from results of various experiments that looking through the gap is the best check method.

SUMMARY OF THE INVENTION

Accordingly, it is an object of the present invention to provide an electrophotographic recording apparatus that is provided with charge carrying drum, an electrostatic recording head to form electrostatic latent images corresponding to given electric signals on said charge carrying drum, an open/close detector element for a housing door, and a control switch to turn on and off a charge carrying drum drive motor when such door is open so the gap may be checked readily.

Other objects and aspects of the present invention will become apparent from the following discussion of the drawings.

DESCRIPTION OF THE PREFERRED EMBODIMENT

Figure 1:
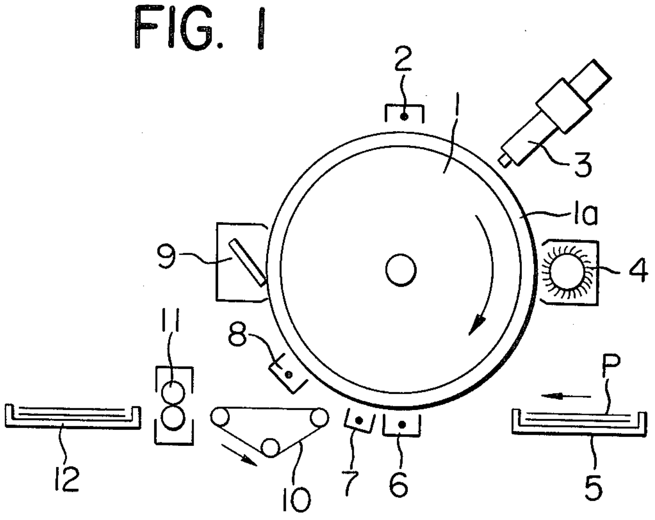
FIG. 1 is a construction diagram of an electrophotographic recording apparatus.

In a construction of electrophotographic recording apparatus as illustrated in FIG. 1, a charge carrying drum 1 driven clockwise at a constant speed is provided with a photoconductor coating 1*a* and surrounded in the order of description by a charging electrode 2 to charge the photoconductor coating 1*a* uniform, an electrostatic recording head 3 to form an optical image corresponding to given external data on the photoconductor coating 1*a* that has been charged, a developing unit 4 to develop a visible image from the electrostatic latent image formed on the photoconductor coating 1*a* by the electrostatic recording head 3, a transfer electrode 6 to transfer the visible image developed from external data on to a copy paper P fed from a paper feed tray 5, a separator electrode 7 to detach the copy paper with an image transferred thereon from the photoconductor drum 1, a neutralizing electrode 8 to remove residual charges that are left on the surface of photoconductor coating 1*a* after the detachment of copy paper, and a cleaning unit 9 to clean residual toner off the surface of coating 1*a*. The copy paper that is detached from the photoconductor coating 1*a* is carried to a fixing unit 11 where the toner image is fused and fixed on to the copy paper. The copy paper with a fixed image is then delivered to a copy receiver tray 12.

Figure 2:
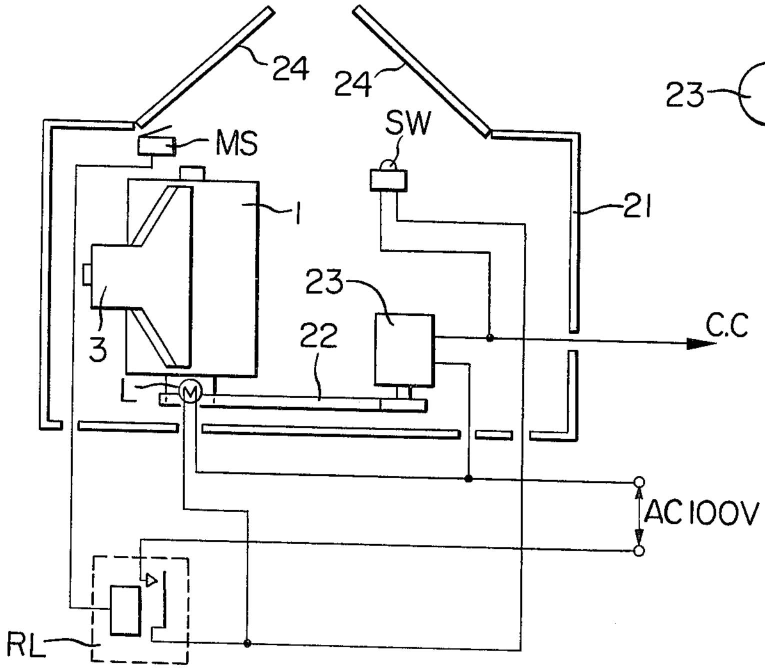
FIG. 2 is a partial view of a setup and electrical circuit embodying the present invention.

According to the present invention, a setup and electric circuit as schematically illustrated in FIG. 2 are added to the above electrophotographic recording apparatus. In the diagram of FIG. 2 as viewed from above at a horizontal cross section, a housing 21 accommodates a charge carrying drum 1, a motor 23 to drive the charge carrying drum 1 through a torque transmission system 22, and an electrostatic recording head 3 to form optical images corresponding to external data on the photoconductor coating 1*a*. The housing 21 is provided with a door 24 and a door open/close detector switch MS to make the circuit when the door 24 opens, while a light source L, such as a pilot lamp or LED, is provided on the inner side of the gap between the OFT and the charge carrying drum 1. Further, a control switch SW is provided which can be operated only when the front door 24 is open. Though not illustrated in FIG. 2, a built-in safety circuit is generally provided to break the control circuit CC of recording apparatus when the door 24 is opened.

Thus, if the door 24 is opened, the open/close detector switch MS is turned on to actuate a mark relay RL and light up the lamp L, so an operator can look into the gap between the electrostatic recording head 3 and the charge carrying drum 1. Then, as the operator turns on the switch SW, the motor 23 starts its rotation and, therefore, the operator can check the status of gap all along the circumference of drum including eccentricty of drum and errors in its fitting condition.

Figure 3:
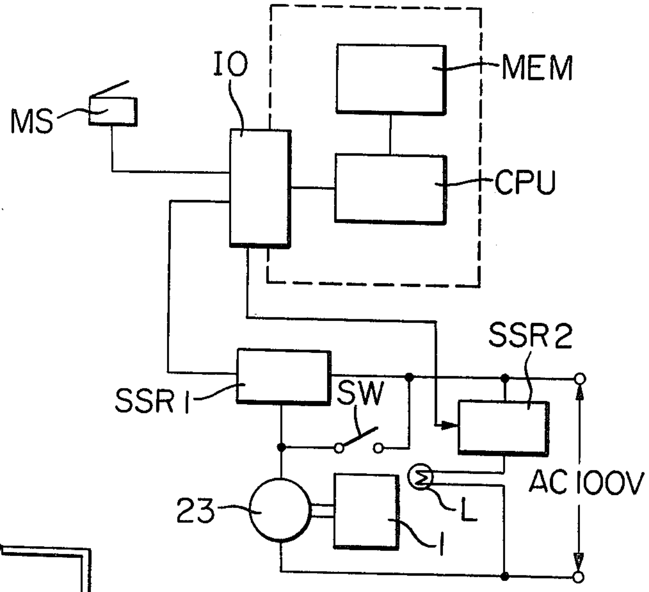
FIG. 3 is a block diagram of a microcomputer controlled circuit.

FIG. 3 is a microcomputer controlled circuit in which a computer CPU with a memory MEM is connected through an input/output unit IO to exterior. The ordinary copy process of the electrophotographic recording apparatus is thus controlled by a controller SSR1, the motor 23 to drive the charge carrying drum 1 being driven according to a program stored in the computer's memory. Now, if the door 24 is opened as illustrated in FIG. 2, the open/close detector switch MS is turned on to switch controllers SSR1 and SSR2 off and on, respectively, so the lamp L provided in proximity to an end face of charge carrying drum 1 is turned on. If the operator then turns on the control switch SW, the motor starts its rotation to drive the drum 1 so it can be checked for its eccentricity and gap condition on rotation.

In the above example, the open/close detector switch MS is turned on when the door 24 opens. However, what is essential is to provide a circuit or mechanism that is never actuated when the door 24 is closed. Further, this switch SW may be, for example, a pushbutton switch that is kept turned on only while it is depressed so the circuit or mechanism may be actuated only when the door is open.

A prerequisite for the above gap check is a clear surface of the photoconductor coating. Residual toner or lint from copy papers, if attached to the surface of photoconductor coating, will not only disturb the check operation but sometimes stick to the electrostatic recording head for its soiling. In the electrophotographic recording apparatus, the cleaning unit 9 as illustrated in FIG. 1 damages the photoconductor coating 1*a* early if they are kept in contact to each other. Therefore, the cleaning unit 9, for example, making use of a blade is so designed that the blade is retracted from the surface of photoconductor coating when the recording system stops normally. In such recording apparatus, the control circuit must be so designed that if the control switch SW is turned on to drive the drum 1, the circuit works so as to protract the blade for cleaning of the surface of photoconductor coating. In the above example, the photoconductor drum is driven by a motor but a manual drum drive mechanism may be provided instead for the gap check in the present invention.

The execution of the present invention has merits that with the gap check switch turned on the drum can be checked readily for its eccentricity and wrong fitting condition, that the gap is illuminated by the light source for gap check so it can be looked through fully from the outer to the inner side of drum, and that with the light source located on the inner side of drum, the gap can be very simply and accurately measured using a spacer gauge or the like.

What is claimed is:

1. In an electrophotographic recording apparatus including a housing, a rotatable charge carrying drum in the housing, an electrostatic recording head disposed in closely spaced gap-defining proximity to the surface of the drum for impressing an electrostatic latent image thereon, a door of the housing movable between closed and open conditions to enable access to the interior of the housing, and means for effecting operative rotation of the drum and for normally disabling drum rotation when the housing door is open, the improvement comprising:

light means in the housing, means for illuminating said light means when the housing door is in its open condition, said light means being so disposed adjacent the closely spaced proximity of the drum and recording head and at a location remote from the housing door that, when the door is open, said light means illuminates the gap between the drum and recording head for ready viewing from the open housing door, and manually operable means for enabling selective rotation of the drum only when the housing door is in its open condition so that, when the housing door is open and the gap between the drum and recording head is illuminated by said light means, operation of said manual means to selectively rotate the drum enables ready viewing of the gap throughout the full rotative circumference of the drum to thereby facilitate servicing of the recording apparatus.

2. In an electrophotographic recording apparatus in accordance with claim 1, said means for illuminating said light means comprising a switch for detecting the condition of the housing door and for causing operating power to be applied to said light means when the door is open.

3. In an electrophotographic recording apparatus in accordance with claim 2, said illuminating means further comprising relay means actuatable by said switch in the open condition of the housing door for applying operating power to said light means.

4. In an electrophotographic recording apparatus in accordance with claim 1, said manually operable means including a switch disposed in the housing and selectively actuatable to effect powered rotation of the drum while the housing door is in its open condition.

5. In an electrophotographic recording apparatus in accordance with claim 1, wherein the drum is mounted for rotation about an axis defined substantially perpendicular to the housing door in the closed condition thereof, said light means being disposed proximate the end of the drum axis most remote from the housing door, such that in the open condition of the door substantially the entire axial length of the gap between the drum surface and the recording head is readily visible from the housing door.

* * * * *